Figure 1:
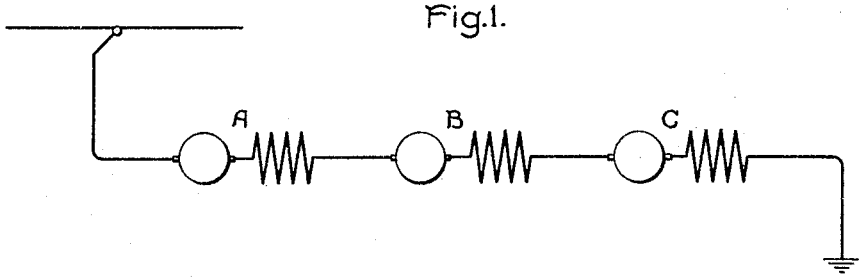

No. 780,580. PATENTED JAN. 24, 1905.
G. W. REMINGTON.
CONTROL OF ELECTRIC MOTORS.
APPLICATION FILED JUNE 26, 1902.

Witnesses.
Erving R. Gurney
Helen Oxford

Inventor.
George W. Remington,
by
Atty.

No. 780,580.                                                           Patented January 24, 1905.

UNITED STATES PATENT OFFICE.

GEORGE W. REMINGTON, OF SCHENECTADY, NEW YORK, ASSIGNOR TO GENERAL ELECTRIC COMPANY, A CORPORATION OF NEW YORK.

CONTROL OF ELECTRIC MOTORS.

SPECIFICATION forming part of Letters Patent No. 780,580, dated January 24, 1905.

Application filed June 26, 1902. Serial No. 113,206.

*To all whom it may concern:*

Be it known that I, GEORGE W. REMINGTON, a citizen of the United States, residing at Schenectady, county of Schenectady, State of New York, have invented certain new and useful Improvements in the Control of Electric Motors, of which the following is a specification.

This invention relates to the control of electric motors; and its object is to provide a means for securing the proper current in each motor when they are connected in series parallel regardless of the number of motors employed.

My invention will probably find most extended use in the application of the well-known series-parallel-system control to a three-motor equipment, and I have chosen to illustrate it in that application. It is not, however, limited to such use, but may be employed generally to maintain certain relative values of the currents in circuits connected in series parallel. The advantages of the series-parallel system of control are well known. The system is usually employed in connection with two or four motors, and under these circumstances the motors are so grouped at all steps of control that they are self-regulating with regard to maintaining a proper current in each motor. Railway-motors are, however, built in standard sizes, and it may be that a car requires a power equipment equal to the combined capacities of three of these motors. In this case two motors would be liable to become overheated, while four motors would involve a considerable expense for equipment over that necessary to drive the car, and, moreover, would operate less efficiently than a three-motor equipment. If a scheme of control similar to the series-parallel system used in connection with four motors were applied to the three-motor equipment, satisfactory operation would be secured in both those steps where the motors were all in parallel and where they were all in series, but when in the change from series to parallel that point was reached which with four motors would be the series-parallel combination (each pair of motors in parallel and the two pairs in series) two of the three motors would be in parallel and in series with the third, under which circumstances were no means provided to secure a proper distribution the sum of the currents flowing through the two motors in parallel would flow through the third motor, thus rendering it liable to dangerous overheating. This difficulty could be avoided by substituting a shunt about the third motor for the fourth motor. A fixed shunt would, however, be impracticable, for the reason that the counter electromotive force of the third motor is variable and therefore requires in order to maintain a proper ratio between the respective currents at all times that the shunt be varied with the variation of the counter electromotive force of the third motor. I meet these requirements by providing a shunt which may be automatically varied to maintain the proper ratio of the currents.

Figure 2:
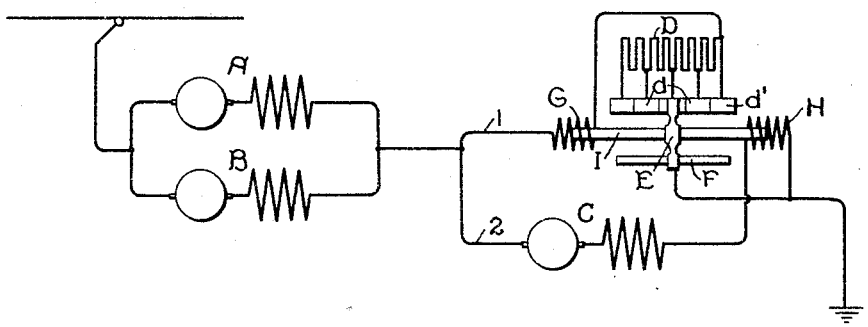
Figure 3:
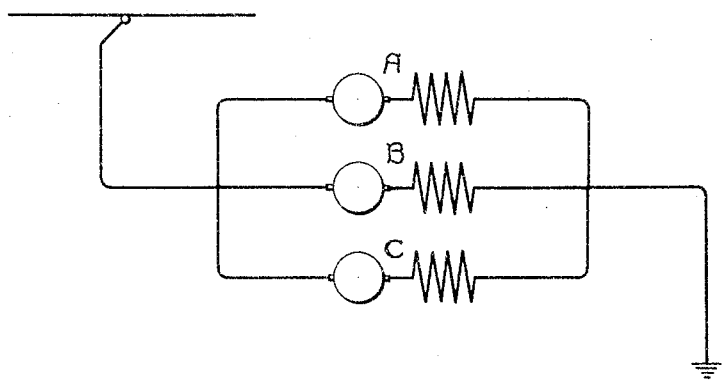

In the accompanying drawings, Figure 1 is a diagram showing the three motors in series. Fig. 2 shows the series-parallel combination with my automatically-variable shunt in circuit, and Fig. 3 shows the parallel arrangement.

The figures illustrate what may be called the three "running-points" or "combinations" of the motor equipment, it being well understood that in making the changes from the off position of the controller to the final parallel combination a number of intermediate points are necessary at which fixed resistances are introduced into circuit or cut out therefrom. The controller for making the necessary changes in the circuit connections may be of any desired construction, it being understood that the contacts are to be so arranged that the connections indicated in the several figures of the drawings will be successively completed with the interposition of such resistance steps as may be necessary or desirable. The construction of such controllers is well understood by those skilled in the art to which this invention relates, and since its illustration in this case would be of no assistance in explaining the invention it has been deemed unnecessary to show it in the drawings.

Referring now to Fig. 2, it will be seen that two of the motors, A and B, are in parallel with each other, the pair being in series with the third motor, C, which is in parallel with my automatically-variable shunt. This device comprises a resistance D, connected to contact-segments $d$. The segment $d'$ is connected with one terminal of the branch circuit 1, containing the resistance D. The other terminal of said circuit 1 is connected with a movable contact-brush E, coöperating with said segments $d$, preferably by means of a contact-strip F, parallel with the segments $d$ and constantly in circuit with the brush E. To move the brush E along the segments, and thus vary the resistance of the branch circuit 1, two differentially-acting solenoids G H are provided, the first in series with the resistance D in branch circuit 1 and the other in series with the motor C in branch circuit 2. An armature or core I common to both solenoids is attached to the brush E. The solenoids exert opposite attractive effects upon the core I, and thus have a differential action.

The operation is as follows: If the speed of the car is low when the series-parallel combination is made by the controller, so that the counter electromotive force of the motor C is small and the current taken by the motor-circuit 2 is large, the solenoid H overbalances the solenoid G and draws the brush E toward the segment $d'$, thus cutting down the resistance of the branch circuit 1 to allow a larger current to flow through it until the solenoids balance each other and hold the brush stationary, this point being reached when the currents in the two branches are equal. If, on the other hand, the speed of the car is high or if it increases while the series-parallel combination is in use, the solenoid H is or becomes the weaker and the solenoid G draws the brush away from the segment $d'$, cutting in resistance until the two branches are equal. These operations take place automatically, so that the apparatus requires no special attention.

While in the illustration chosen the means for varying the shunt is so constructed and arranged as to maintain the currents equal, it will be readily understood that the construction and arrangement may be such as to maintain any desired ratio of the currents.

It will be evident to those skilled in the art that my invention furnishes a means by which an indefinite number of groups of motors composed of different numbers of motors in parallel may be successfully connected in series by connecting a shunt about each group containing a number of motors less than the maximum number contained in any one group, which shunt is automatically variable, so that it will carry its proper proportion of current at all times, thus increasing the current-carrying capacity of the smaller groups to that of the group containing the maximum number of motors. It will also be evident that certain relative values of the currents may be maintained in any number of circuits in parallel, for if the currents in any two of the circuits are maintained at a certain ratio one of the two circuits and another may be similarly governed and the scheme thus extended indefinitely.

Various other applications of my invention and various modifications of the apparatus employed may be made without departing from my invention, and I do not, therefore, wish to be limited to the particular system or to the particular apparatus shown in the drawings.

What I claim as new, and desire to secure by Letters Patent of the United States, is—

1. The combination of a plurality of electric motors connected in series parallel, the groups in series comprising unequal numbers of motors in parallel, and means controlled by the currents in said motors for maintaining the proper current per motor.

2. The combination of a plurality of electric motors connected in series parallel, the groups in series comprising different numbers of motors in parallel, a variable shunt about each group containing a smaller number of motors than the maximum, and means for automatically varying said shunt or shunts to maintain the proper current per motor.

3. The combination of a plurality of electric motors connected in series parallel, the groups in series comprising different numbers of motors in parallel, a variable shunt about each group having a smaller number of motors than the maximum, and means actuated by the current in said smaller group or groups of motors to vary said shunt or shunts.

4. The combination of a plurality of electric motors connected in series parallel, the groups in series comprising different numbers of motors in parallel, a variable shunt about each group having a smaller number of motors than the maximum, and means actuated differentially by the currents in said smaller group or groups of motors and in said shunt or shunts to vary said shunt or shunts.

5. The combination of a plurality of electric motors connected in series parallel, the groups in series being of different current-carrying capacity, a variable shunt about each group having a smaller current-carrying capacity than the maximum, and means actuated differentially by the currents in said smaller group or groups of motors and in said shunt or shunts to vary said shunt or shunts.

6. The combination of a plurality of electric motors connected in series parallel, the groups in series being composed of different numbers of motors in parallel, a resistance in shunt with each group having a smaller number of motors than the maximum, and means actuated differentially by the currents in said smaller group or groups and in said resistance or resistances to vary said resistance or resistances.

7. The combination of a plurality of electric motors connected in series parallel, the groups in series being composed of different numbers of motors in parallel, a resistance in shunt about each of said groups having a smaller number of motors than the maximum, a solenoid in series with each resistance so arranged as to tend to increase it, and a solenoid in series with each of said smaller groups of motors tending to decrease the resistance in shunt therewith.

8. The combination of two groups of motors composed of different numbers of motors in parallel, connected in series, a variable shunt about the group containing the smaller number of motors, and means actuated differentially by the currents in said shunt and in said smaller group of motors to vary said shunt.

9. The combination with three electric motors and a variable resistance, of a movable contact therefor, a solenoid in series with said resistance, and a solenoid in a shunt around said resistance, said solenoids being arranged to exert opposite attractive effects on said movable contact, one of said motors being in the shunt around said resistance, and the other two in series parallel therewith.

10. The combination of a plurality of electric circuits connected in series parallel, a variable shunt for one or more of said circuits, and means controlled by the currents in said circuits and shunt for varying said shunt and maintaining the proper current per circuit.

11. The combination of a plurality of electric circuits connected in series parallel, the groups in series being of different current-carrying capacity, a variable shunt about each group having a smaller current-carrying capacity than the maximum, and means actuated differentially by the currents in the smaller group or groups of circuits and in said shunt or shunts to vary said shunt or shunts.

12. The combination of a plurality of motors connected in series parallel, a variable shunt for one or more of said motors, and means whereby the currents in said motor or motors and said shunt act differentially to vary said shunt.

13. The combination of a plurality of motors connected in series parallel, a variable shunt for one or more of said motors, a solenoid in said shunt, and a solenoid in circuit with said motor or motors, said solenoids being arranged to act differentially upon said shunt.

14. The combination of a plurality of motors connected in series parallel, a resistance in shunt to one or more of said motors, a solenoid in circuit with said motor or motors tending to decrease said resistance, and a solenoid in series with said resistance tending to increase said resistance.

15. The combination of a plurality of circuits arranged to be connected first in series parallel and then in parallel, and means controlled by the currents in said circuits for maintaining the proper current per circuit during the series-parallel arrangement.

In witness whereof I have hereunto set my hand this 24th day of June, 1902.

GEORGE W. REMINGTON.

Witnesses:
BENJAMIN B. HULL,
HELEN ORFORD.